Patented Sept. 28, 1943

2,330,452

UNITED STATES PATENT OFFICE 2,330,452

METHOD OF MAKING MERCURIC NAPHTHENATE

Harold Schiller, Los Angeles, Calif., assignor to Socony-Vacuum Oil Company, Incorporated, New York, N. Y., a corporation of New York No Drawing. Application April 28, 1941, Serial No. 390,749

3 Claims. (Cl. 260—431)

The methods heretofore proposed for the manufacture of mercuric naphthenate are inapplicable to the preparations of the dry salt in a pale color by reason of the relative instability of this particular naphthenate.

For example, in the modification of the fusion method in which dry, firmly pulverized mercuric acetate is reacted with naphthenic acids in the absence of water, the reaction does not attain completion until after considerable heating to drive off the acetic acid produced. This heating causes partial decomposition of the product with the elimination of mercuric oxide, and results in a dark colored product containing free naphthenic acids. This undesirable result obtains even with the use of low subatmospheric pressures in the absence of water.

For example, at temperatures around 230° F., three hours' heating at 20 mm. pressure may eliminate as much as one-third of the mercury while eight hours' exposure to such temperature and pressure may decompose the naphthenate almost completely and cause substantially all of the mercury to be carried away as vapor or precipitated as the oxide.

I have discovered that pale-colored, stable, and pure mercuric naphthenate may be made by the modification of this process which consists in conducting the above reaction in the presence of steam or of a small quantity of boiling water, as described in the following example.

To two equivalent weights of naphthenic acids (as calculated from the neutralization number) I add one mol weight of mercuric acetate in the form of a dry powder. The mixture is heated to and maintained at a temperature ranging from 230° to 240° Fahr. At this point a part but not all of the mercuric acetate dissolves in the naphthenic acid and some acetic acid is evolved.

Distilled water to the extent of about ten per cent of the reaction mixture is now added and, as the temperature is maintained at 230/240° Fahr., the added water and more acetic acid are vaporized and driven off. On the addition of the water, any solid mercuric acetate dispersed in the naphthenic acid-mercuric acetate solution appears to dissolve in the added water and, upon evaporation of the added water and consequent concentration of mercuric acetate in the aqueous phase, reaction takes place more readily than under substantially anhydrous conditions.

This addition and evaporation of water is repeated until no further acetic acid vapor is dissolved and until the mercuric naphthenate is free from dispersed mercuric acetate.

Following the above procedure and using pale purified petroleum naphthenic acids of 251 neutralization number, I prepare a pale colored and stable mercuric naphthenate showing on analysis 30.70% mercury as compared with a theoretical mercury content of 31.07%.

In the above process the heating of the naphthenic acids may precede or follow the addition of the mercuric acetate, or the latter may be added in fractions as the reaction proceeds.

Where any considerable quantity of the naphthenate is to be prepared, the above method may be modified by passing a continuous flow of wet steam through the suspension of mercuric acetate in naphthenic acid, so regulating the heat supply to the reaction vessel and the rate of steam flow as to maintain constantly a small quantity of liquid water in the mass. The steam flow is continued until no more acetic acid is evolved, after which the water remaining in the mercuric naphthenate is evaporated off.

Either of the methods described above may be used for making the mercuric salt of the saturated fatty acids containing seven or more carbon atoms, such as heptylic, lauric, myristic, palmitic, and stearic acids. It is not applicable to the unsaturated fatty acids such as oleic acid.

I claim as my invention:

1. The method of making mercuric naphthenate which comprises: suspending solid mercuric acetate in naphthenic acids in approximately equivalent ratios; heating the suspension; adding water in relatively small quantity, and maintaining the temperature sufficiently high to vaporize the added water together with the acetic acid produced by the reaction of said acetate with said naphthenic acids.

2. The method of making mercuric naphthenate which comprises: suspending solid mercuric acetate in naphthenic acids in approximately equivalent ratios; heating the suspension; adding water in relatively small quantity; passing a flow of steam through the reacting mass and maintaining the temperature sufficiently high to vaporize the acetic acid produced by the reaction between said acetate and said naphthenic acids; and finally vaporizing any remaining free water.

3. The method of making mercuric naphthenate which comprises: suspending solid mercuric acetate in naphthenic acids in approximately equivalent ratios; adding water in relatively small quantity; maintaining the temperature substantially within the range from 230° to 240° F. until the added water and the acetic acid produced by reaction between said acetate and said acids have been removed.

HAROLD SCHILLER.